Aug. 12, 1958  J. P. KLEIBER ET AL  2,847,066
TIME OPERATED FISH FEEDING DEVICE
Filed April 14, 1955  2 Sheets-Sheet 1
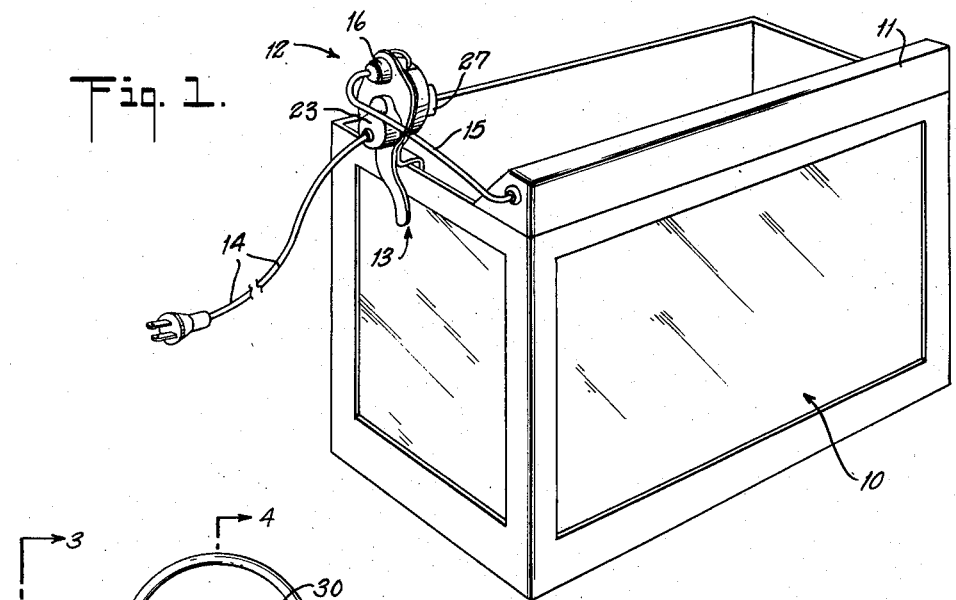
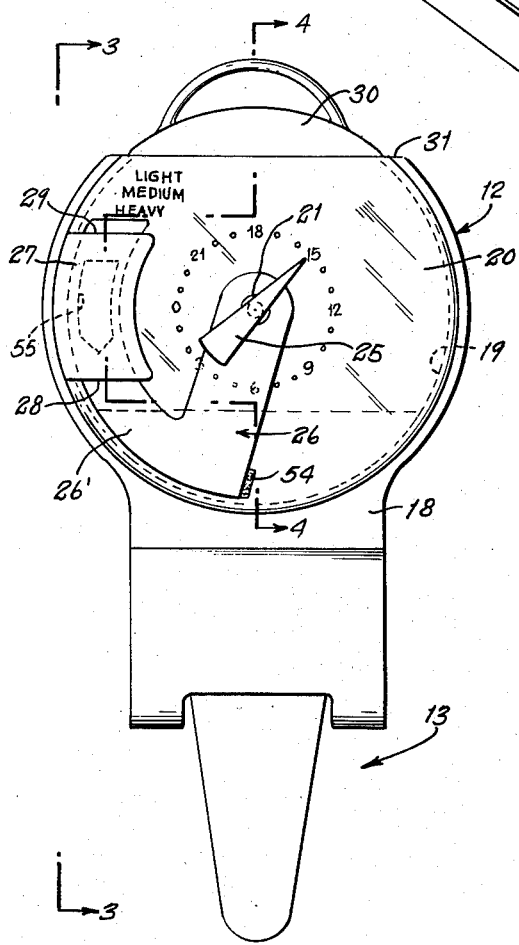
INVENTORS
JOSEPH P. KLEIBER
ODIF PODELL
BY
ATTORNEY

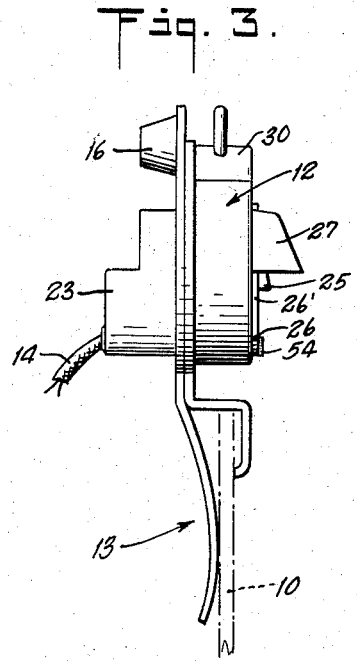
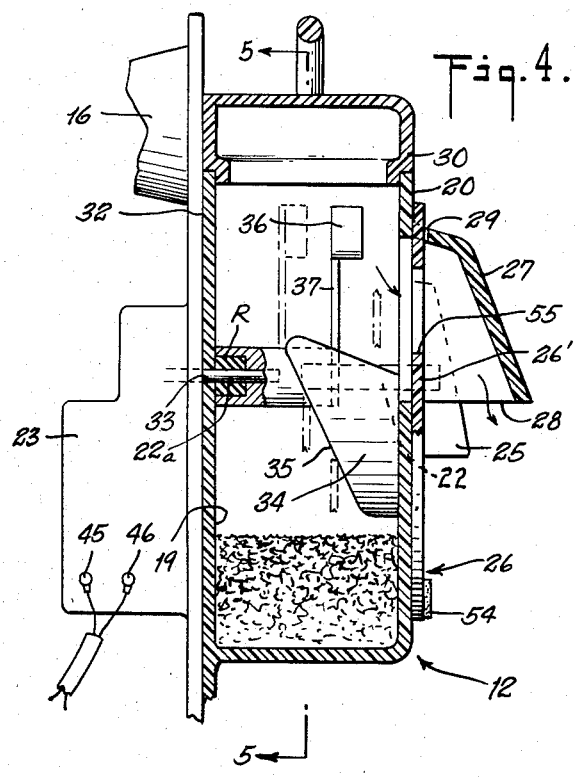
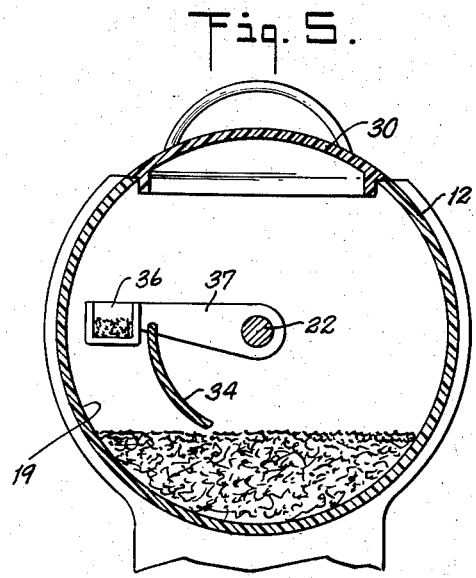
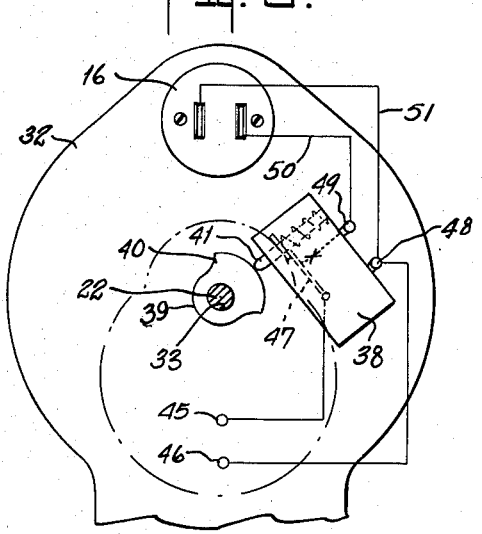
INVENTORS
JOSEPH P. KLEIBER
ODIF PODELL

2,847,066
TIME OPERATED FISH FEEDING DEVICE

Joseph Paul Kleiber, Yonkers, and Odif Podell, Pleasantville, N. Y.

Application April 14, 1955, Serial No. 501,408

2 Claims. (Cl. 161—10)

This invention relates to an automatic feeding device and more particularly to a feeding device operated by a time driven motor to in turn intermittently supply food to captive fish or animals. In feeding captive fish or animals, it is desirable that a uniform quantity of feed be supplied at a given time or times during each day. It is further desirable that the feeding may be provided with an automatic device requiring little or no human assistance.

It is an object of this invention to provide an automatic feeding device that is controlled by a time controlled motor.

It is a further object of this invention to provide an automatic rotatable feeding device that will pick up a predetermined quantity of feed for each rotation and will dispense this feed at a predetermined time.

A further object of this invention is to provide an automatic feeding device that is controlled by a time operated motor in which the device is affixed to an aquarium and the aquarium electric light is in turn connected to this device so that the light is energized before and during each feeding operation.

A still further object of this invention is to provide a rotatable feeding device for an aquarium in which the device is driven by a time synchronized motor in which the device is preloaded with a quantity of feed and in which a dispensing member will pick up a predetermined quantity of feed and dispense the feed with a positive snap action.

Other objects of this invention shall be apparent by reference to the accompanying detailed description and the drawings in which Fig. 1 is a perspective view of an aquarium with the automatic feeding device and aquarium light attached thereto, Fig. 2 is a front elevational view of the feeding device, Fig. 3 is a side elevational view taken on line 3—3 of Fig. 2, Fig. 4 is a cross sectional view taken on line 4—4 of Fig. 2, Fig. 5 is a cross sectional view taken on line 5—5 of Fig. 4, and Fig. 6 is a rear elevational view with the switch cover removed and a schematic circuit diagram shown.

Referring to the drawings there is illustrated in Fig. 1 an aquarium 10 with a light 11 attached to the upper portion of the aquarium and an automatic feeding device 12 also attached to the upper edge of the aquarium by a spring clamp 13. The feeding device is connected to a 110 volt source of electric supply by a cord 14 and the feeding device is in turn connected to the light 11 by an extension cord 15 that is plugged into a socket 16 in the feeding device 12. Referring to Fig. 2 there is illustrated an elevational view of the feeding device 12. On one face thereof there is a plurality of indicia representing a clock face. The clock face in this instance is divided into 24 hours rather than a 12 hour face and of course the rotating element will make one revolution in 24 hours. Although this embodiment is designed for one revolution in 24 hours, similarly the device may be designed for one revolution in 12 hours or two revolutions in 24 hours. The feeding device 12 comprises a body member 18. The member 18 is provided with a circular chamber 19. The front face 20 of the circular chamber 19 will be provided with an aperture 21 for a shaft 22 to extend through. Shaft 22 is at its other end connected by a friction element R to the drive shaft 22A of motor 23; shaft 22 and shaft 22A will make one revolution in 24 hours. On the clock face end of shaft 22 a knob and pointer element 25 is rigidly affixed to the shaft 22 to rotate with same, although due to the friction mounting it will permit adjusting or turning shaft 22 so that the pointer will register at any particular setting as desired. Also pivotally attached on shaft 22 and lying adjacent to face 20 is an adjustable window element 26 which does not turn with shaft 22. There is an extended portion $26^1$ which is a part of arm 26, portion $26^1$ generally conforms to the circular periphery of chamber 19 and will have a frictional bearing either with face 20 or the periphery of chamber 19 so that arm $26^1$ may be adjusted in a circular movement and retain a set position which will be described later. The face 20 of body member 18 is also provided with a dispensing spout 27. The dispensing spout 27 is open on the bottom edge 28 and is also provided with an aperture 29 on its upper edge, the aperture 29 being of the same size as arm 26 to permit arm 26 to pass therethrough. Member 18 is also provided with a removable cover 30 on its upper edge 31 so that the cover may be removed for filling the chamber 19 or partially filling the chamber 19 with feed. Referring to Fig. 4 chamber 19 is provided with a rear wall 32. The rear wall is provided with an aperture 33 through which shaft 22A passes. The motor 23 is affixed to the wall 32 as illustrated in Fig. 4. Within chamber 19 there is a cam shaped ramp element 34 which may be attached to the inside of the front wall 20. The element 34 provides a cam face 35 for the feeding or dispensing element to bear against during its rotation. Also mounted within chamber 19 is a dispensing cup 36 (Fig. 5). The cup 36 is mounted on a rotatable spring arm 37, the arm 37 being affixed to shaft 22 (Fig. 4). Referring to Fig. 6 it is apparent that the rear wall 32 of the member 18 may also support a switch 38. Switch 38 is mounted so that it is sufficiently spaced from the center of shaft 22 so that a rotating cam element 39 may be mounted on shaft 22 and for each rotation of shaft 22 the cam face 40 of the cam element 39 will bear against the actuating element 41 of switch 38. In this instance switch 38 is a micro-switch. Element 41 in the position illustrated in Fig. 6 will close switch 38. When cam 39 has rotated to the point where cam face 40 moves out of contact with element 41, element 41 being spring pressed outward will move into contact with the lower area of cam 39 and switch 38 will again open.

Referring to Figs. 1 and 3 the 110 A. C. supply line 14 is connected to the motor 23 at its terminals 45 and 46 and in addition the A. C. is supplied to switch 38 and in turn through socket 16 to supply the necessary power for the light 11. However referring to Fig. 6 the terminals 45 and 46 are diagrammatically illustrated as connected, that is, terminal 45 is connected to the switch element 47 while terminal 46 is connected to the terminal 48 of switch 38. Element 47 in the position illustrated in Fig. 6 is shown as making contact with the stationary element of terminal 49 showing the circuit in its closed position. Terminal 49 is connected by a lead 50 to one side of socket 16, the opposite side of socket 16 is connected by a line 51 to terminal 48. Thus the circuit as shown in Fig. 6 is closed supplying the 110 A. C. to the socket 16.

Referring to Figs. 2 and 3 there is illustrated a form of spring clamp 13 that is used to support member 18. Referring to element 26, Fig. 2 and Fig. 4, although this element is pivotally supported on shaft 22 it must have a frictional engagement either as already mentioned or by affixing a rubber block 54 to arm 26¹. Arm 26¹ is provided with an aperture 55.

In operation it is apparent that the device must be plugged into 110 A. C. supply to operate the motor 23 and since the motor 23 is a synchronous motor, it will produce one revolution of shaft 22 for each 24 hours. The knob 25 permits the rotation and adjustment of shaft 22 to any starting position, that is, the position of shaft 22 is with relation to the feeding arm. If a particular time of feeding is chosen, the feed arm 37 must be in the position as illustrated in Fig. 5 for dispensing the feed. Therefore the setting of knob 25 will be adjusted to a position so that feed arm 37 reaches the position illustrated in Fig. 5 at the desired time keeping in mind at all times that arm 37 makes one revolution in 24 hours as indicated by the indicia on face 20. In the event a feeding is desired twice in a 24 hour interval, this may be accomplished as already suggested by using a 12 hour synchronous motor or as in this embodiment two arms 37 may be mounted in opposed relation on shaft 22 so that the feed will be discharged at the same time during each 12 hour period. Or, in a still further variation three arms 37 may be used as mounted on shaft 22 and spaced in a predetermined relation so that the feed is discharged during each 8 hour interval. Referring to the Fig. 4 it is apparent that feed cup 36 will be rotated in one complete revolution every 24 hours. It is to be noted that the open face of the feed cup is on the dispensing side, toward the front face 20. As the feed cup 36 passes through the feed it picks up feed from the bottom of chamber 19. As the spring arm 37 rises it will bear against the cam face 35 and cam face 35 will deflect spring arm 37 to the left (Fig. 4) until arm 37 reaches the top of cam face 35. As the arm 37 clears face 35 due to its deflection when released, it will spring toward the right (Fig. 4) and this snap action will force all of the feed in cup 36 to be thrown through the window 55 of arm 26¹. The feed will thus be dispensed through the spout 27 dropping in a somewhat sprayed or spread out form through the aperture 28 onto the surface of the water of the aquarium. The arm 26¹ may be adjusted (Fig. 4) to permit a complete clearance and the complete discharge of the feed from cup 36 or it may be moved slightly to partially cut off the discharge.

Thus by regulating arm 26¹ so that the top of the arm registers with indicia indicating maximum to minimum, the amount of feed in cup 36 to be discharged may be controlled.

The front face of member 18 may be composed of a clear plastic so that the amount of feed in chamber 19 may be watched and thus replenished when necessary.

Although the automatic feeding device disclosed herein has been shown as associated with an aquarium, it may similarly be connected to any type of tank for marine life or to a cage or enclosure for captive animals. Likewise although the device is of an appropriate size for an aquarium it may be enlarged for other uses or for dispensing food of a greater bulk without departing from the spirit of this and this invention shall be limited only by the appended claims.

What is claimed is:

1. In a feed measuring and dispensing apparatus the combination of a casing with a chamber therein for a quantity of feed, said casing provided with a removable cover for filling said chamber, a rotary driven dispensing cup, said cup driven by a synchronous motor, means for frictionally attaching the cup to the drive shaft to permit adjusting the position of said cup, said dispensing cup supported on a spring arm, a cam mounted within said chamber to deflect said spring arm of said cup during its cycle of rotation, an adjustable feed discharge the outlet.

2. In a device according to claim 1 in which a knob and pointer are attached to the end of the shaft supporting the feed cup and in juxta-position to the outer face of the device, a plurality of indicia in the nature of a clock face concentrically surrounding the pointer and knob element.

References Cited in the file of this patent

UNITED STATES PATENTS

| | | |
|---|---|---|
| 848,101 | Hale | Mar. 26, 1907 |
| 1,684,334 | Toope | Sept. 11, 1928 |
| 2,275,887 | Chandler | Mar. 10, 1942 |
| 2,528,742 | Coffing | Nov. 7, 1950 |
| 2,534,442 | Harvey | Dec. 19, 1950 |
| 2,700,489 | Sheft | Jan. 25, 1955 |

FOREIGN PATENTS

| | | |
|---|---|---|
| 913,055 | France | May 20, 1946 |